(12) United States Patent
Niitsuma

(10) Patent No.: US 11,330,809 B2
(45) Date of Patent: May 17, 2022

(54) SPINNING REEL

(71) Applicant: Shimano Inc., Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/205,724

(22) Filed: Mar. 18, 2021

(65) Prior Publication Data
US 2021/0352881 A1 Nov. 18, 2021

(30) Foreign Application Priority Data
May 18, 2020 (JP) .............................. JP2020-086983

(51) Int. Cl.
*A01K 89/01* (2006.01)
*A01K 89/015* (2006.01)

(52) U.S. Cl.
CPC .............................. *A01K 89/01912* (2015.05)

(58) Field of Classification Search
CPC ........ A01K 89/01912; A01K 89/01143; A01K 89/01902
See application file for complete search history.

(56) References Cited

FOREIGN PATENT DOCUMENTS

JP 11-86 B2 1/1999

*Primary Examiner* — Emmanuel M Marcelo

(74) *Attorney, Agent, or Firm* — Global IP Counselors, LLP

(57) ABSTRACT

A spinning reel includes a spool shaft, a handle, a pinion gear, a first intermediate gear, a second intermediate gear, and a reciprocating mechanism. The first intermediate gear is rotatably disposed around a first shaft parallel to the spool shaft. The first intermediate gear includes a first large-diameter gear which meshes with the pinion gear and a first small-diameter gear which integrally rotates with the first large-diameter gear. The second intermediate gear is rotatably disposed around a second shaft parallel to the first shaft. The second intermediate gear includes a second large-diameter gear which meshes with the first small-diameter gear and a second small-diameter gear which integrally rotates with the second large-diameter gear. The reciprocating mechanism includes a driven gear which meshes with the second small-diameter gear and reciprocates the spool shaft in the front-rear direction.

5 Claims, 5 Drawing Sheets

SPINNING REEL

CROSS-REFERENCE TO RELATED APPLICATIONS

This application claims priority to Japanese Patent Application No. 2020-086983, filed on May 18, 2020. The entire disclosure of Japanese Patent Application No. 2020-086983 is hereby incorporated herein by reference.

BACKGROUND

Field of the Invention

The present invention relates to a spinning reel.

Background Art

Conventional spinning reels include a reciprocating mechanism for uniformly winding a fishing line on a spool. For example, the reciprocating mechanism recited in Japanese Patent Laid-Open No. 11-86 includes a driven gear to which rotation of a handle is transmitted. The rotation of the handle is transmitted to the driven gear via a reduction gear mechanism which densely winds a fishing line around a spool. The reduction gear mechanism includes a worm gear which meshes with the driven gear.

SUMMARY

It has been determined that when a reduction gear mechanism does not include a worm gear which meshes with a driven gear, if a gear of the reduction gear mechanism is enlarged to obtain a desired gear ratio, a reel body must also be enlarged.

An object of the present invention is to provide a spinning reel capable of densely winding a fishing line around a spool while avoiding an increase in the size of the reel body.

A spinning reel according to one aspect of the present invention includes a reel body, a spool shaft, a spool, a handle, a pinion gear, a first intermediate gear, a second intermediate gear, and a reciprocating mechanism. The spool shaft is supported so as to be movable in the front-rear direction with respect to the reel body. The spool is supported by the spool shaft and fishing line is wound around the outer periphery. The handle is rotatably supported by the reel body. The pinion gear is rotatably supported by the reel body and the rotation of the handle is transmitted to the pinion gear. The first intermediate gear is rotatably disposed around a first shaft parallel to the spool shaft. The first intermediate gear includes a first large-diameter gear which meshes with the pinion gear and a first small-diameter gear which has a smaller diameter than the first large-diameter gear and integrally rotates with the first large-diameter gear. The second intermediate gear is rotatably disposed around a second shaft parallel to the first shaft. The second intermediate gear includes a second large-diameter gear which meshes with the first small-diameter gear and a second small-diameter gear which has a smaller diameter than the second large-diameter gear and integrally rotates with the second large-diameter gear. The reciprocating mechanism includes a driven gear which meshes with the second small-diameter gear and a worm shaft which integrally rotates with the driven gear and reciprocates the spool shaft in the front-rear direction.

In this spinning reel, each of the first intermediate gear and the second intermediate gear which meshes with the first intermediate gear is composed of a stepped gear and the rotation of the pinion gear is transmitted to the driven gear of the reciprocating mechanism via the first intermediate gear ant the second intermediate gear. That is, the rotation of the pinion gear is greatly decelerated and transmitted by the first intermediate gear and the second intermediate gear. Additionally, by preventing or reducing the increase in size of the first intermediate gear and the second intermediate gear, it is possible to densely wind the fishing line around the spool by the reciprocating mechanism while preventing or reducing the increase in size of the reel body.

The reel body can include a housing, a rod-attaching part to which a fishing rod is attached, and a leg part connecting the housing and the rod-attaching part. One of the worm shaft and the first shaft can be arranged at a position closer to the leg part than the spool shaft when viewed from the axial direction of the spool shaft. The other one of the worm shaft and the first shaft can be arranged at a position farther from the leg part than the spool shaft when viewed from the axial direction of the spool shaft. In this embodiment, the first shaft and the worm shaft are arranged with the spool shaft therebetween. Therefore, it is possible to concentrate the first intermediate gear, the second intermediate gear, the worm shaft and a like to one side of the spool shaft inside of the reel body when viewed from the axial direction of the spool shaft, while preventing or reducing the increase in size of the reel body.

The worm shaft can be arranged at a position closer to the leg part than the spool shaft when viewed from the axial direction of the spool shaft. Also in this embodiment, it is possible to concentrate the first intermediate gear, the second intermediate gear, the worm shaft and the like to one side of the spool shaft inside of the reel body when viewed from the axial direction of the spool shaft, while preventing or reducing the increase in size of the reel body.

The driven gear can be arranged at a position farther from the spool than the second large-diameter gear in the axial direction of the spool shaft. In this embodiment, the size of the reel body can be reduced in the axial direction of the spool shaft.

The module of the second large-diameter gear can be 0.3 or less. In this embodiment, the fishing line can be more densely wound around the spool by the reciprocating mechanism.

According to the present invention, it is possible to provide a spinning reel capable of densely winding a fishing line around a spool while preventing or reducing an increase in size of a reel body.

DETAILED DESCRIPTION OF EMBODIMENTS

Figure 1:
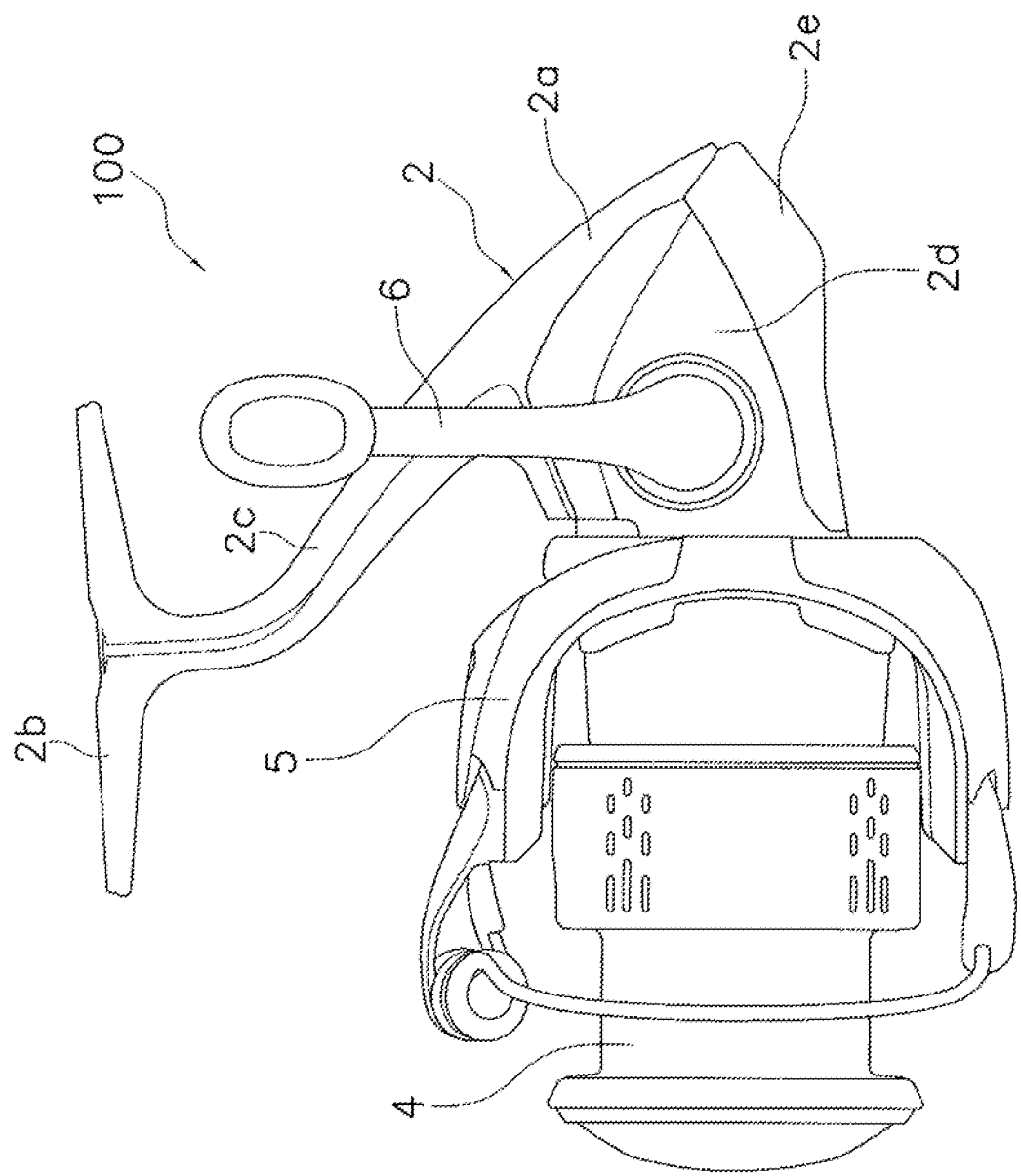
FIG. 1 is a side view of a spinning reel.
Figure 2:
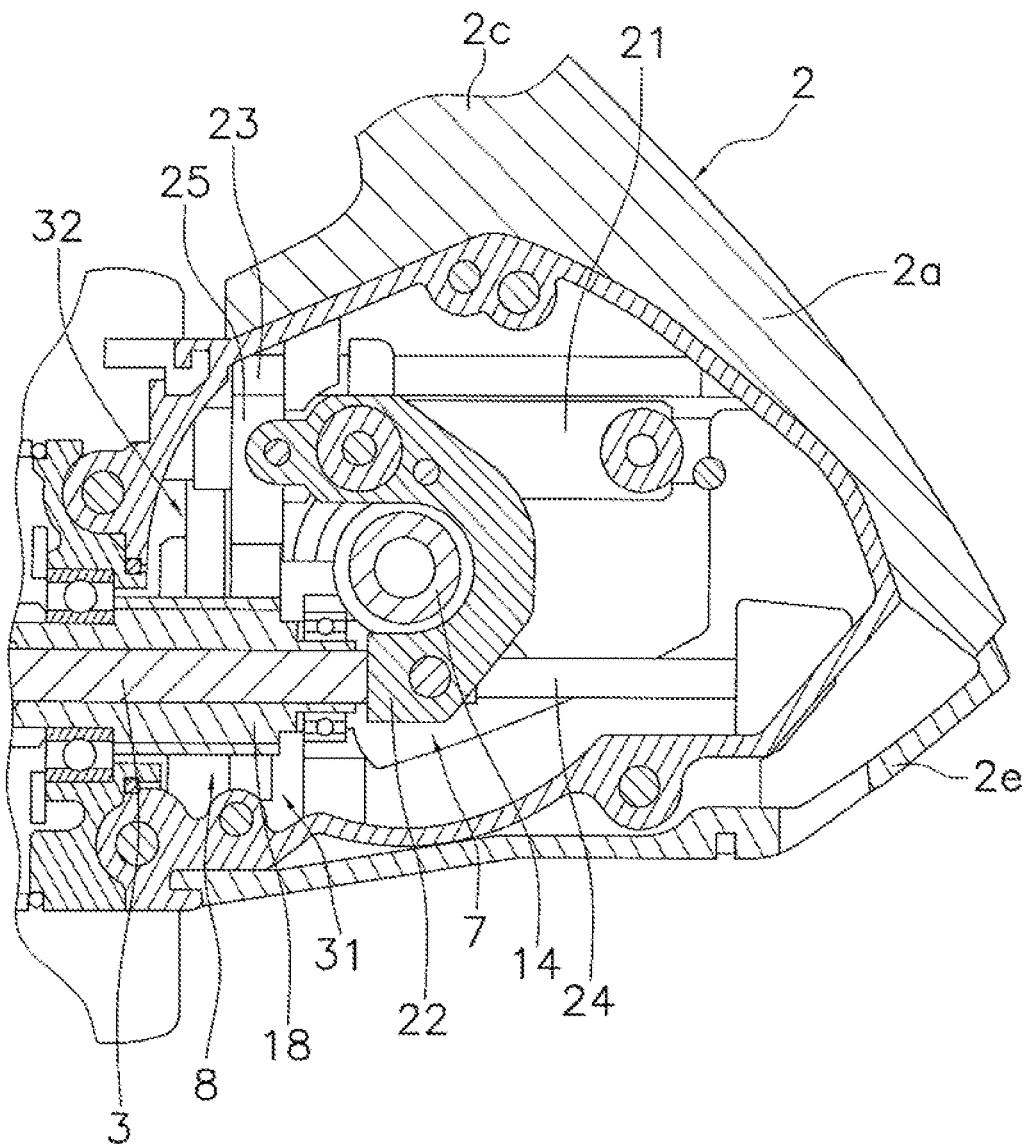
FIG. 2 is a partial longitudinal section view of a spinning reel.

In the following description, the term, "front and rear", means that the direction in which a fishing line is delivered when fishing is the "front" and the opposite direction is the "rear". Additionally, the term, "left and right", refers to the left and right when viewing the spinning reel 100 from the rear side. For example, in FIG. 1, the left side of FIG. 1 is the "front", the right side is the "rear", the near side of the figure is the "left", and the back side of the figure is the "right". Also, as shown in FIG. 2, the direction in which the spool shaft 3 extends is defined as the axial direction.

The spinning reel 100 according to one embodiment of the present invention includes a reel body 2, a spool shaft 3, a spool 4, a rotor 5, a handle 6, a reciprocating mechanism 7, and a reduction gear mechanism 8.

The reel body 2 has a housing 2a, a rod-attaching part 2b, and a leg part 2c. The housing 2a is open on one side (here, on the left side). As shown in FIG. 2, the reciprocating mechanism 7, the reduction gear mechanism 8, and a rotor driving mechanism 12 (see FIG. 3) for driving the rotor 5 are housed inside of the housing 2a.

The rod-attaching part 2b is a portion to which a fishing rod is attached. The rod-attaching part 2b is disposed on the upper part of the reel body 2 and extends in the front-rear direction. The leg part 2c extends in the vertical direction and connects the housing 2a and the rod-attaching part 2b.

The reel body 2 includes a lid member 2d which covers the opening of the housing 2a, and a cover member 2e which covers the rear side of the housing 2a.

The spool shaft 3 extends in the front-rear direction. The spool shaft 3 is supported so as to be movable in the front-rear direction with respect to the reel body.

The spool 4 is a member around which the fishing line is wound on the outer periphery. The spool 4 is supported by the spool shaft 3. In detail, the spool 4 is fixed to the spool shaft 3 by a knob member (not shown) screwed onto the tip of the spool shaft 3. The spool 4 integrally reciprocates in the axial direction with the spool 3 in association with the rotation of the handle 6.

The rotor 5 is a member for winding the fishing line around the spool 4. The rotor 5 can rotate around the axis of the spool shaft 3 and winds the fishing line around the spool 4 in accordance with the rotation of the handle 6 in a line-winding direction.

The handle 6 is rotatably supported by the reel body 2. The handle 6 is disposed on the left side portion of the reel body 2 in this embodiment.

Figure 3:
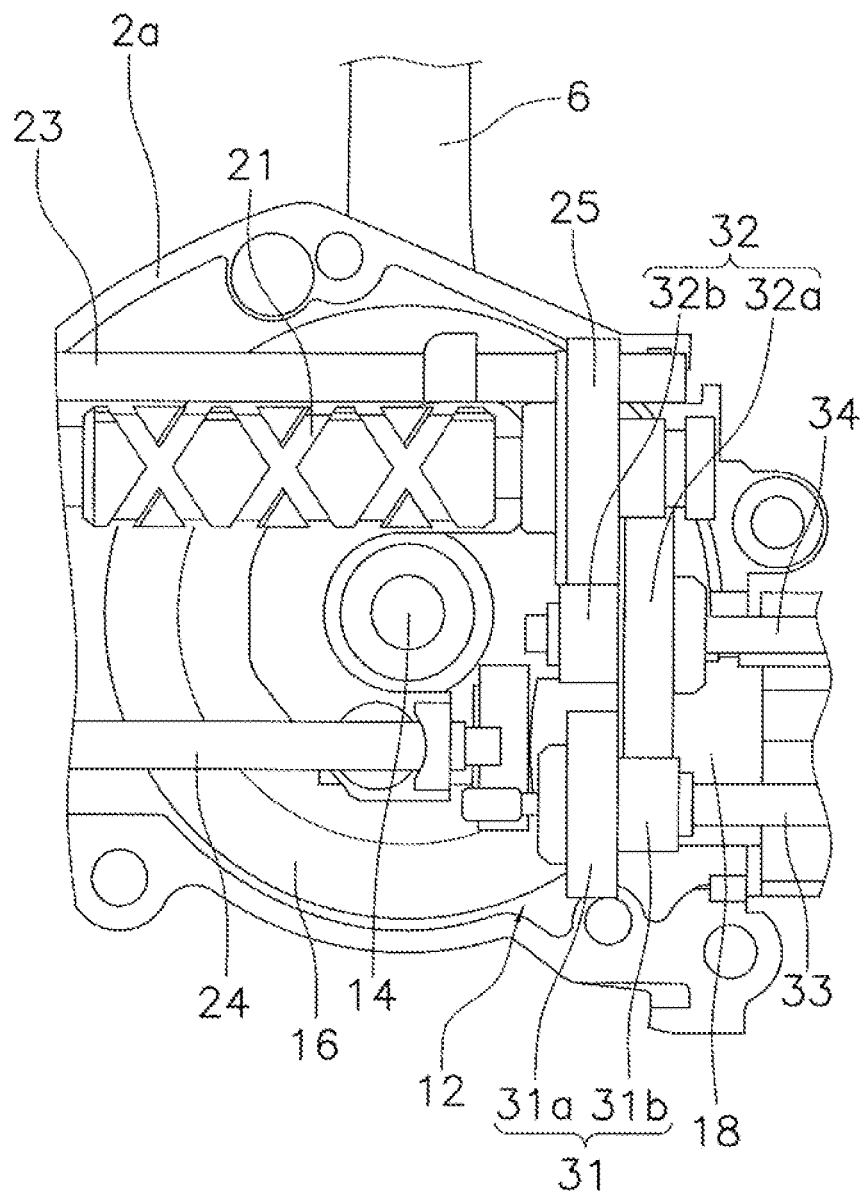
FIG. 3 is a view of the inside of a reel body with a housing of a reel body omitted when viewed from the right side.

FIG. 3 is a view of the inside of the reel body 2 when viewed from the right side, in a state in which the housing 2a of the reel body 2 is omitted. As shown in FIG. 3, the rotor driving mechanism 12 includes a drive shaft 14, a driving gear 16, and a pinion gear 18. The drive shaft 14 is a cylindrical shaft and supported by a bearing (not shown) on the reel body 2 so as to be rotatable. The drive shaft 14 extends in the left and right direction and is connected to the handle 6 so as to be integrally rotatable.

The driving gear 16 is connected to the drive shaft 14 and integrally rotates with the drive shaft 14. In one embodiment, the drive shaft 14 and the driving gear 16 are a single member. The driving gear 16 is a face gear and meshes with the pinion gear 18. The pinion gear 18 is a cylindrical shaft and arranged around the axis of the spool shaft 3. The pinion gear 18 is connected to the rotor 5 so as to be integrally rotatable. The pinion gear 18 is supported on the reel body 2 so as to be rotatable, via a plurality of bearings arranged on the reel body 2. Since the drive shaft 14 and the driving gear 16 rotate in accordance with the rotation of the handle 6 and the pinion gear 18 which meshes with the driving gear 16 rotates, the rotation of the handle 6 is transmitted to the rotor 5.

The reciprocating mechanism 7 reciprocates the spool 4 in the axial direction in accordance with the rotation of the handle 6. The reciprocating mechanism 7, as shown in FIG. 2, includes a worm shaft 21, a slider 22, guide shafts 23, 24, and a driven gear 25.

Figure 4:
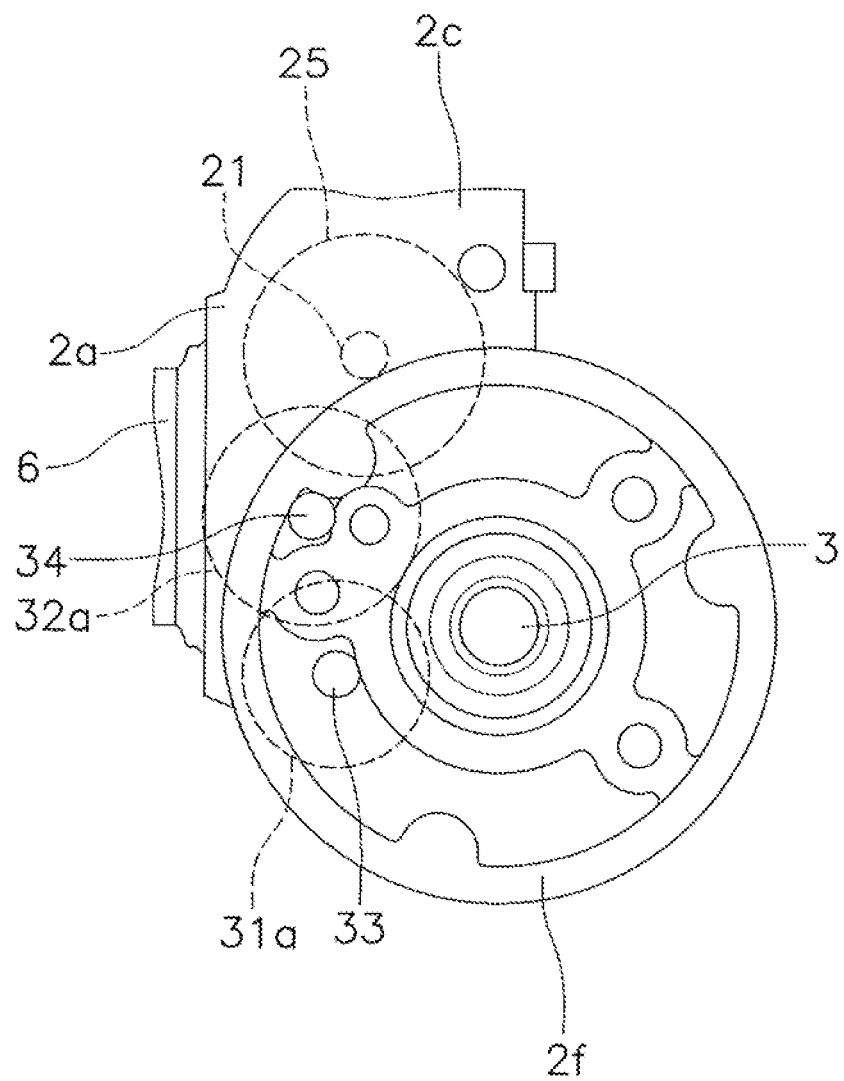
FIG. 4 is a view for demonstrating the positional relationship between a worm shaft and a first shaft.

The worm shaft 21 is rotatably supported by the reel body 2 via a bearing arranged on the reel body 2. Additionally, the worm shaft 21 is arranged above the drive shaft 14 to be parallel to the spool shaft 3. FIG. 4 is a view of a part of the reel body 2 from the front side. As shown in FIG. 4, the worm shaft 21 is arranged at a position closer to the leg part 2c than the spool shaft 3 when viewed from the axial direction. As shown in FIG. 3, a spiral groove is formed on the outer periphery of the worm shaft 21. The spiral groove of the worm shaft 21 is omitted in FIG. 2.

The slider 22 extends in the vertical direction, sandwiching the drive shaft 14 and is formed in a general U shape on the outer periphery of the drive shaft 14. The slider 22 is fixed on the rear end of the spool shaft 3. The slider 22 has an engagement pin (not shown) which engages with the spiral groove of the worm shaft 21.

The guide shafts 23, 24 guide the reciprocation of the slider 22 in the axial direction. The guide shaft 23 is supported by the reel body 2 above the worm shaft 21 and arranged to be parallel to the spool shaft 3. The guide shaft 24 is supported by the reel body 2 below the drive shaft 14 and arranged to be parallel to the spool shaft 3. The movement of the slider 22 in the axial direction can be guided by a single guide shaft. For example, the guide shaft 24 can be omitted.

The driven gear 25 is connected to the worm shaft 21 so as to be integrally rotatable. In this embodiment, the driven gear 25 is a spur gear. The rotation of the handle 6 is transmitted to the driven gear 25 via the reduction gear mechanism 8. When the rotation of the handle 6 is transmitted to the driven gear 25, the worm shaft 21 rotates. Then, in accordance with the rotation of the worm shaft 21, the engagement pin of the slider 22 is guided into the spiral groove of the worm shaft 21 and the spool shaft 3 reciprocates in the axial direction with the slider 22.

The reduction gear mechanism 8 decelerates and transmits the rotation of the handle 6 to the driven gear 25. In detail, the reduction gear mechanism 8 decelerates and transmits the rotation of the pinion gear 18 to the driven gear 25. It is preferable that the reduction gear mechanism 8 decelerates the rotation so that the reduction gear ratio between the pinion gear 18 and the driven gear 25 is about 6. The reduction gear mechanism 8 includes a first intermediate gear 31 and a second intermediate gear 32.

The first intermediate gear 31 is rotatably disposed around a first shaft 33 parallel to the spool shaft 3. The first shaft 33 is supported by the reel body 2. The first shaft 33 is arranged at a position farther from the leg part 2c than the spool shaft 3 when viewed from the axial direction. That is, the first shaft 33 is arranged below the spool shaft 3 when viewed from the axial direction. The first shaft 33 and the worm shaft 21 are arranged so as to sandwich the spool shaft 3 in the vertical direction. The movement of the first intermediate gear 31 in the axial direction is restricted by a mechanism supporting part 2f disposed inside of the housing 2a of the reel body 2. The first intermediate gear 31 includes a first large-diameter gear 31a and a first small-diameter gear 31b. The first large-diameter gear 31a is a helical gear and meshes with the pinion gear 18. The diameter of the first large-diameter gear 31a is smaller than the diameter of the driven gear 25.

The first small-diameter gear 31b is a spur gear. The first small-diameter gear 31b has smaller diameter than the first large-diameter gear 31a and integrally rotates with the first large-diameter gear 31a around the first shaft 33. The first small-diameter gear 31b is arranged in front of the first large-diameter gear 31a. In this embodiment, the first large-diameter gear 31a and the first small-diameter gear 31b are configured separately. In detail, the first small-diameter gear 31a has a catching part on the rear side, which engages a non-circular hole formed on the inner periphery of the first large-diameter gear 31a, and is connected to the first large-diameter gear 31a so as to be integrally rotatable. Meanwhile, the first small-diameter gear 31b can be integrally formed with the first large-diameter gear 31a.

The second intermediate gear 32 is rotatably disposed around a second shaft 34 parallel to the first shaft 33. The second shaft 34 is arranged to be parallel to the spool shaft 3. The second shaft 34 is arranged above the spool shaft 3 when viewed from the axial direction. The second shaft 34 is supported by the reel body 2. The movement of second intermediate gear 32 in the axial direction is restricted by the mechanism supporting part 2f The second intermediate gear 32 includes a second large-diameter gear 32a and a second small-diameter gear 32b. The second large-diameter gear 32a and the second small-diameter gear 32b are spur gears. The second large-diameter gear 32a meshes with the first small-diameter gear 31b. The diameter of the second large-diameter gear 32a is larger than the diameter of the first large-diameter gear 31a and smaller than the diameter of the driven gear 25. The second large-diameter gear 32a is arranged in front of the driven gear 25. That is, the driven gear 25 is arranged at a position farther apart from the spool 4 than the second large-diameter gear 32a in the axial direction. The second large-diameter gear 32a overlaps with the driven gear 25 and the first large-diameter gear 31a when viewed from the axial direction. The module of the second large-diameter gear 32a is preferably 0.3 or less.

The second small-diameter gear 32b has a smaller diameter than the second large-diameter gear 32a and integrally rotates with the second large-diameter gear 32a. The second small-diameter gear 32b is arranged behind the second large-diameter gear 32a. The second small-diameter gear 32b meshes with the driven gear 25. In this embodiment, the second large-diameter gear 32a and the second small-diameter gear 32b are configured separately. In one embodiment, the second small-diameter gear 32b has a catching part on the front side, which engages a non-circular hole formed on the inner periphery of the second large-diameter gear 32a, and is connected to the second large-diameter gear 32a so as to be integrally rotatable. Meanwhile, the second small-diameter gear 32b can be integrally formed with the second large-diameter gear 32a.

In the spinning reel 100 with the above configuration, the rotation of the pinion gear 18 is decelerated and transmitted to the driven gear 25 by the first intermediate gear 31 and the second intermediate gear 32 of the reduction gear mechanism 8. This way, the moving speed of the reciprocating mechanism 7 in the axial direction can be significantly reduced. Furthermore, it is possible to prevent or reduce the increase in size of the reduction gear mechanism 8, compared to when the reduction gear mechanism 8 includes only one intermediate gear, for example. That is, by preventing or reducing the increase in size of the first intermediate gear 31 and the second intermediate gear 32, it is possible to densely wind the fishing line around the spool 4 by the reciprocating mechanism 7 while suppressing the increase in size of the reel body 2.

Other Embodiments

One embodiment of the present invention has been described above, however, the present invention is not limited to the above embodiment and various modifications are possible without deviating from the gist of the invention. For example, the handle 6 can be arranged on the right side portion of the reel body 2.

In the above embodiment, the driven gear 25 and the second small-diameter gear 32b which engages with the driven gear 25 are spur gears. However, these gears can be helical gears.

Figure 5:
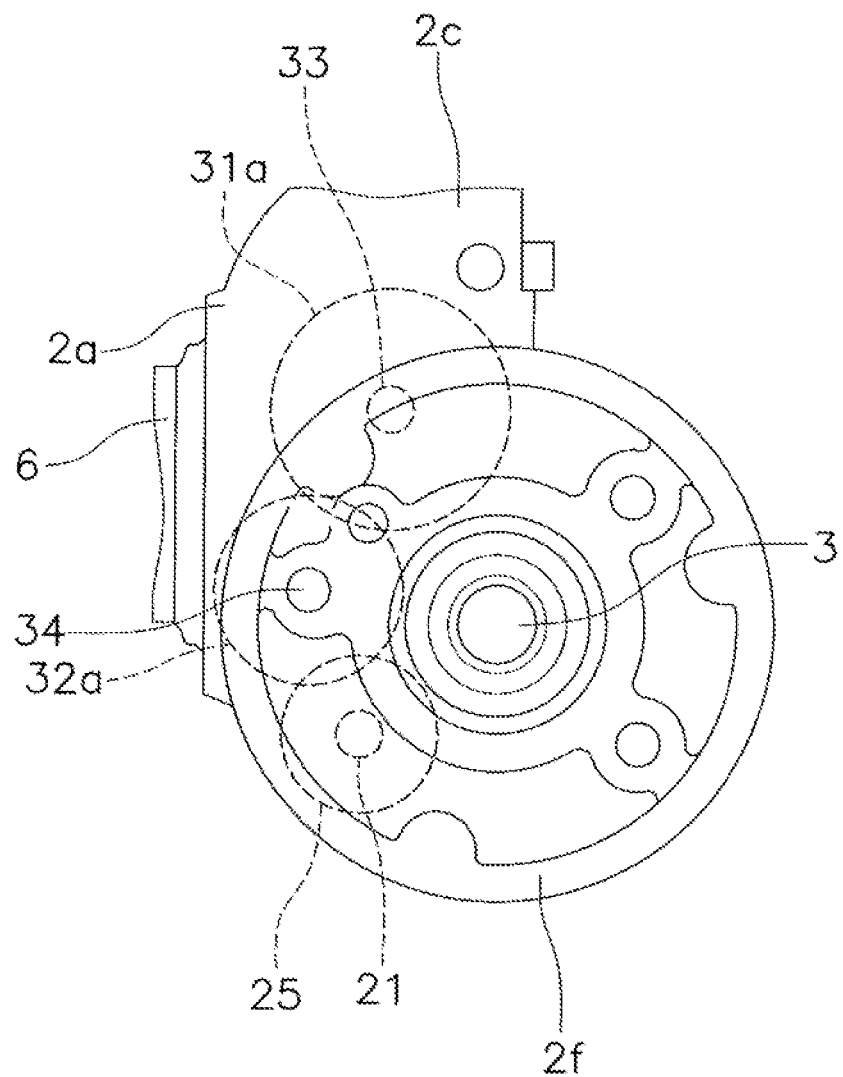
FIG. 5 is a view for demonstrating the positional relationship between a worm shaft and a first shaft according to a modified example.

In one embodiment, the worm shaft 21 is arranged at a position closer to the leg part 2c than the spool shaft 3 and the first shaft 33 is arranged at a position farther apart from the leg part 2c than the spool shaft 3 when viewed from the axial direction. However, these arrangements can be modified. For example, as schematically shown in the FIG. 5, the worm shaft 21 can be arranged at a position farther apart from the leg part 2c than the spool shaft 3 and the first shaft 33 can be arranged at a position closer to the leg part 2c than the spool shaft 3 when viewed from the axial direction.

What is claimed is:

1. A spinning reel comprising:
   a reel body;
   a spool shaft supported so as to be movable in a front-rear direction with respect to the reel body;
   a spool connected to the spool shaft and around which a fishing line is capable of being wound on an outer periphery thereof;
   a handle rotatably supported by the reel body;
   a pinion gear rotatably supported by the reel body and rotation of the handle is transmitted thereto;
   a first intermediate gear including a first large-diameter gear that meshes with the pinion gear and a first small-diameter gear that has a smaller diameter than the first large-diameter gear and is configured to integrally rotate with the first large-diameter gear, and is rotatably disposed around a first shaft parallel to the spool shaft;
   a second intermediate gear including a second large-diameter gear that meshes with the first small-diameter gear and a second small-diameter gear that has a smaller diameter than the second large-diameter gear and integrally rotates with the second large-diameter gear, and is rotatably disposed around a second shaft parallel to the first shaft; and
   a reciprocating mechanism including a driven gear that meshes with the second small-diameter gear and a worm shaft that integrally rotates with the driven gear and reciprocates the spool shaft in the front-rear direction.

2. The spinning reel according to claim 1, wherein
   the reel body includes a housing, a rod-attaching part to which a fishing rod is attached, and a leg part connecting the housing and the rod-attaching part;
   one of the worm shaft and the first shaft is capable of being arranged at a position closer to the leg part than the spool shaft when viewed from an axial direction of the spool shaft; and
   an other one of the worm shaft and the first shaft is capable of being arranged at a position farther from the leg part than the spool shaft when viewed from the axial direction of the spool shaft.

3. The spinning reel according to claim 2, wherein
   the worm shaft is arranged at a position closer to the leg part than the spool shaft when viewed from the axial direction of the spool shaft.

4. The spinning reel according to claim 1, wherein
the driven gear is arranged at a position farther apart from the spool than the second large-diameter gear in an axial direction of the spool shaft.

5. The spinning reel according to claim 1 wherein
a module of the second large-diameter gear is 0.3 or less.

* * * * *